3,432,584
PROCESS FOR THE MANUFACTURE OF A REVERSE OSMOSIS MEMBRANE HAVING A NONHEATING ANNEALING STEP
Charles R. Cannon, Baldwin Park, Paul A. Cantor, Covina, and William M. King, Walnut, Calif., assignors to Aerojet-General Corporation, El Monte, Calif., a corporation of Ohio
No Drawing. Filed Feb. 17, 1966, Ser. No. 528,064
U.S. Cl. 264—49   8 Claims
Int. Cl. B29d 27/00

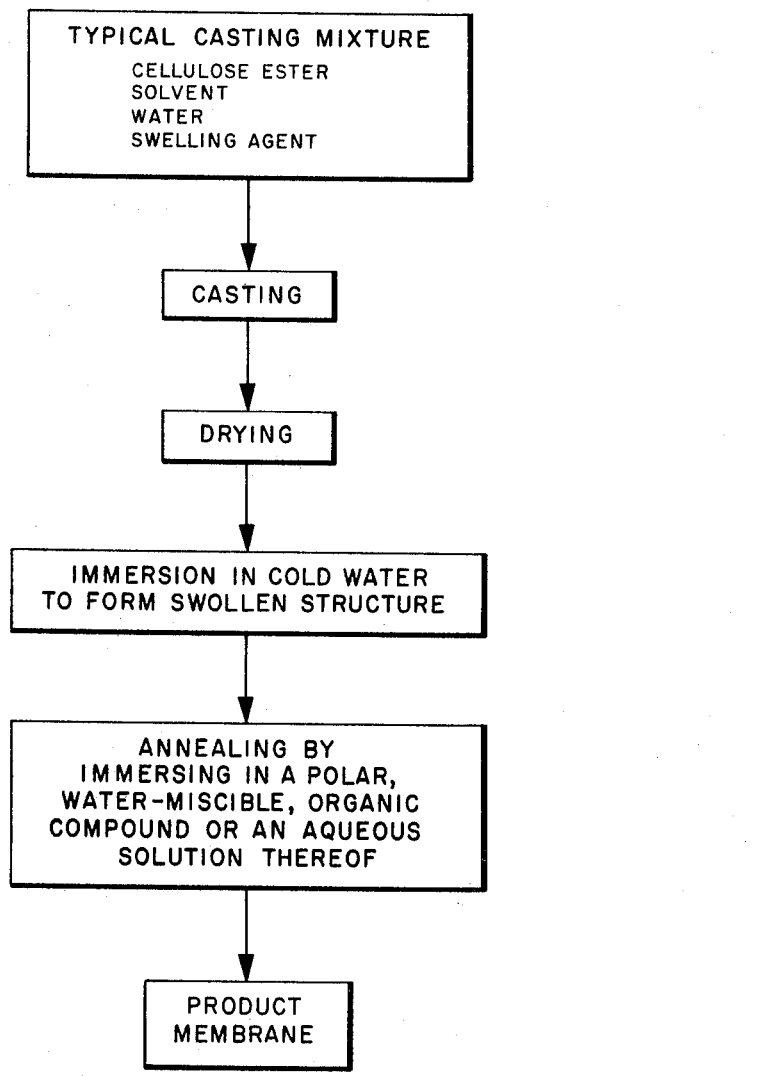

ABSTRACT OF THE DISCLOSURE

In the manufacture of a reverse osmosis membrane, the swollen gel structure of the newly cast membrane is freed of its excess water to give a tight membrane by immersion in an organic solvent containing extraction liquid.

---

This invention relates to reverse osmosis membranes and more particularly to an improvement in the manufacture of the membranes.

It has been proposed heretofore to employ cellulose ester membranes in a reverse osmosis technique for the desalination of sea water and generally for the separation of water from various aqueous solutions. In one prior art process for the preparation of the membrane, as taught in Loeb et al. U.S. Patents 3,133,132 and 3,133,137, the cellulose ester, usually cellulose acetate, is dissolved in a suitable organic solvent such as acetone to form a casting solution which in addition contains water and a swelling agent for the cellulose acetate. Loeb et al. employ as their swelling agent a perchlorate salt. It is known that other materials, including certain organic compounds may be used as swelling agents as disclosed in the copending application of William M. King and Paul A. Cantor, Ser. No. 521,034, filed Jan. 17, 1966, assigned to the assignee of the present application. The casting solution is dispersed in a thin film on a suitable casting surface to form a membrane, following which the solution is usually partially evaporated and then set in cold water. In the prior art processes, the cast film, which has a swollen gel structure is annealed by heating at an elevated temperature in a water bath to accomplish a contraction of the cellulose acetate structure which provides a tight membrane having the ability to pass water and restrain passage of salt. The composition of the casting solution, and the fabrication temperatures including the temperature of the water of the annealing bath are all known to be interrelated, in that they influence the characteristics of the membrane including its water content, the rate of water transport thereacross, as well as the selective permeability of the membrane to a salt solution being processed. Slight variations in conditions surrounding the annealing step may well affect rather drastically the properties of the cellulose ester membrane.

It is a principal object of the invention to provide a solvent annealing process for the extraction of excess water from the swollen gel structure in the manufacture of a cellulosic reverse osmosis membrane.

It is a further object of the invention to provide a process for the syneresis extraction of water from a swollen gel membrane structure employing less exacting conditions of manufacture.

Additional objects will become apparent from the reading of specification and claims which follow.

It has now been found that a cellulosic membrane suitable for reverse osmosis may be produced by a process employing a non-heating annealing procedure and more specifically an annealing procedure involving solvent extraction of the excess water from the swollen gel structure. In the process of the invention the heating of the membrane is eliminated and replaced with a solvent treatment or annealing step. It has been observed that the solvent annealing procedure produces a membrane which is generally superior to that of Loeb et al. in the treatment of brackish waters.

In forming the membrane, a solution of cellulose acetate or other cellulose ester is prepared in an organic solvent, for example, acetone, or other known solvents for the cellulose ester. A typical casting solution will comprise 22.2 parts by water of cellulose acetate and 66.7 parts by weight of the acetone. The solution of cellulose acetate is then mixed with a swelling agent such as an aqueous solution of a perchlorate salt, e.g., magnesium perchlorate, or with an organic swelling agent of the type disclosed in copending U.S. patent application, Ser. No. 521,034, filed Jan. 17, 1966, by William M. King and Paul A. Cantor. A particularly desirable organic swelling agent is tartaric acid. In accordance with known practice the casting solution is then chilled to about $-13°$ C. (in the instance of an acetone solvent) and cast as a membrane at that low temperature. The casting may be accomplished by feeding the chilled solution through a hollow doctor blade with the blade resting on raised brackets at the edges of a glass plate. Typically, the blade is pulled across the plate at a rate such that the film which is formed has a thickness between 10 and 20 mils. The conventional casting rate is about 18 inches of film per second. Following casting, the film in the instance of an acetone solution is allowed to set for about three minutes at $-13°$ C. to allow for the evaporation of a portion of the solvent. During the casting operation, the doctor blade and casting surface which may be a glass plate, are all maintained at about $-13°$ C.

Following the casting of the film and partial evaporation of the solvent, the casting plate and the film thereon are dipped into cold water which ranges in temperature from about 1 to about 10° C. For an acetone casting solution, the temperature of the water bath is preferably maintained at about 1.5 to 2° C. The casting plate is thrust into the ice water bath in one continuous motion with the plate making an angle of between about 30 to about 60° with the surface of the water. The film will soon float off the glass casting plate, at which time it will be strong enough to manipulate. The membrane film is rolled up in a damp state. If the film is permitted to dry, it will lose its desirable properties and is unsuitable for desalination. It will be understood that the conditions employed in the manufacture of the swollen film in preparation for the annealing or syneresis step will vary considerably depending on the technique used and the composition of the casting solution.

Prior to annealing which in the instance of the prior art is the thermal treatment step, the cellulose ester membrane possesses a primary gel structure which exhibits high water transport rates and low salt retentions. Heating of the primary gel membrane results in a syneresis shrinkage, evidenced by loss of water from the membrane. This syneresis phenomenon is thought to result from the formation of greater numbers of or stronger ligand bonds between polar sites (the hydroxyl and acetate groups) of the cellulose acetate. Heating provides energy which is required to bring these sites into bonding distance. After conversion to a secondary gel structure, the cellulosic membranes exhibit reduced water transport rates but vastly improved high salt retentions.

The water found in the primary gel structure of the pre-annealed membrane is thought to exist in two forms including that which bonds directly to specific groups in the polymer structure (bound water) and that which fills interstices within the structure without any specific solvent-polymer interaction (capillary water). It is believed that the water which is expelled from the primary gel structure during annealing is chiefly of the capillary type, although it appears that some of the less tenaciously bound water may also be lost from the structure. The temperature of the heat-annealing operation as practiced heretofore appears to have a definite bearing upon the quantity of water expelled from the cellulosic gell structure during syneresis and an indirect effect upon the salt retention and water transport characteristics of the end membrane.

In the process of the invention, syneresis water is extracted from the primary gel structure during annealing by a solvent treatment which comprises immersing the swollen primary gel structure in a water-miscible, organic compound containing polar liquid which is capable of extracting water from the swollen gel structure and thus substantially reducing the water content of the membrane. The water-miscible extracting liquid has little or substantially no solubility for the cellulosic ester.

It so happens that many of the desirable polar organic solvents which have a high miscibility for water and hence are especially suitable for use in the process of the invention, also are capable of dissolving cellulose esters. Syneresis water extracting liquids may be prepared using the latter organic solvents even though they have a significant solubility for the cellulose ester by placing them in water solution with the water being provided in an amount adequate to protect the cellulose ester from dissolution by the polar organic component of the syneresis extracting liquid. The solvent syneresis annealing of the invention is conveniently carried on at a temperature in the range of about 20 to about 30° C. Unlike the heat treatment annealing procedure disclosed in the Loeb et al. patents, the temperature of the syneresis step using the polar organic solvent is not critical and variations in temperature may occur without seriously affecting the properties of the reverse osmosis membrane.

Among the solvents which may be employed in the annealing process of the invention are the lower alkanols exemplified by methanol, ethanol, n-propanol, isopropanol, tertiary butanol, isobutanol, and secondary butanol. Methanol and ethanol may be used without water dilution since they have no appreciable solubility for cellulose acetate. However, the butanols do have some solubility for cellulosic esters and it is advisable that the latter solvents be employed in water diluted form. Other solvents which may be used are the aliphatic ketones exemplified by acetone and methylethylketone. Acetone is a particularly desirable solvent; however, because of its high solubility for the cellulose esters it is necessary to use acetone in solution with water. Among the heterocyclics solvents which may be employed are 1,3- and 1,4-dioxane, tetrahydrofuran, pyrrolidine and pyrazine. Various ones of the water-miscible ethers may be utilized including 2-ethoxyethanol and 2-methoxyethanol.

A further category of solvents which we can employ are the lower nitriles as exemplified by acetonitrile, propionitrile, and butyronitrile. Still another category of solvent which we employ are esters of aliphatic acids as exemplified by ethyl acetate, isopropyl acetate, hydroxyethyl acetate, methoxyethyl acetate, glycol diacetate, methyl glycolate, isopropyl lactate, ethyl lactate, and methyl lactate. Another category of solvents which we can employ are aliphatic amides as exemplified by formamide, acetamide, propionamide, butyramide, valeramide, caproamide, and heptanoamide. A still further category of solvents which we can employ are polyols such as ethylene glycol, propylene glycol, and glycerine. Another category of appropriate solvents are the aliphatic diketones as exemplified by acetonylacetone, and acetyl acetone. Appropriate amine solvents which we can employ are the lower aliphatic amines such as propyl amine, butyl amine, tertiary butyl amine, secondary butyl amine, isobutyl amine, and amyl amine. Still other appropriate solvents which we can employ are butyrolactone, ethylene chlorohydrin, and resorcinol.

Particularly useful aqueous solvent mixtures for the annealing treatment of primary gel membranes are aqueous acetone and aqueous dioxane. The aqueous acetone and aqueous dioxane solutions preferably contain from about 20 to about 30% by weight of acetone and dioxane with the particular concentration being varied according to the properties desired in the cellulose ester membrane.

It will be appreciated that some of the foregoing listed water miscible polar organic solvents do have some solubility for the cellulosic esters including cellulose acetate. Hence, care must be taken to adjust the strength of the solvent so as to avoid harm to the film for the period of time it is immersed. Normally, the solvent-annealing treatment of the primary gel membrane may be accomplished in periods of time less than 12 minutes where the bath is maintained at ambient room temperature. In the event that the solvent employed has an adverse effect upon the cellulose ester film, i.e., tends to dissolve it, this may be remedied by diluting the solvent through addition of water.

Following the solvent-annealment treatment, the membrane may be either stored in water or kept damp with water until such time that it is ready for use.

To further illustrate our invention, there is presented a table of data. All of the membranes discussed in the table were cast in the same manner using the same materials and were treated substantially identically prior to the solvent treatment step. Each of the membranes was made by forming a casting solution of 22.2 grams of cellulose acetate in 66.7 grams of acetone. This solution was then mixed with 13 grams of a solution containing 10 grams of water and three grams of magnesium perchlorate. Following the mixing of the two solutions, they were placed in a stoppered bottle which was then sealed and then placed in a bottle roller. The solutions were mixed on the roller for 250 minutes and chilled to about −13° C. They were then fed through a doctor blade which was moved across a glass plate to form a cellulose acetate film. During the casting operation, the doctor blade and glass plate were maintained at −13° C. Following casting, the films were allowed to set for about three minutes at −13° C., after which they were removed from the glass plate by dipping the plate into ice water maintained between 1.5 to 2° C., the plate being placed into the ice water in one continuous motion while the plate made an angle of about 30 to about 60 degrees with the water level. The films floated off the glass by this treatment and were then rolled up and kept damp until such time as they were treated by solvent-annealing process of the invention.

In Table I, the solvent with which the films were treated is set forth in the left column. The solvents are there described in terms of the volume percent of solvent in an aqueous solution. In the next column is set forth the immersion time during which the film was immersed in the solvent. In the next column is set forth the flux through the treated film in gallons per square foot per twenty-four hour period when the film was subjected in a standard test cell to a feed stream of water containing 35,000 parts per million of sodium chloride under 1,500 pounds per square inch gauge pressure. In the next column is set forth the salt permeation or the salinity of the product stream in parts per million of sodium chloride. In the next column is set forth the flux in gallons per square foot per day when the film was subjected to a feed stream containing 5,000 parts per million of sodium chloride under a pressure of 750 pounds per square inch gauge. In the last column is set forth the salt permeation or the salinity of the product stream in parts per million of sodium chloride.

TABLE I

| Solvent | Immersion Time (Minutes) | 1,500 p.s.i.g., 35,000 p.p.m. NaCl | | 750 p.s.i.g., 5,000 p.p.m. NaCl | |
|---|---|---|---|---|---|
| | | Flux (g.f.d.) | Salt Permeation (p.p.m.) | Flux (g.f.d.) | Salt Permeation (p.p.m.) |
| 20% Acetone | 2 | 57 | 20,000 | | |
| | 4 | 51 | 16,000 | | |
| | 6 | 46 | 13,800 | | |
| | 8 | 42 | 14,500 | | |
| | 10 | 40 | 11,900 | | |
| | 12 | 40 | 14,000 | | |
| 22.5% Acetone | 4 | 54   61 | 10,500   9,200 | | |
| | 6 | 72   63 | 7,800   9,300 | | |
| | 8 | 74   69 | 7,600   8,000 | | |
| 25% Acetone | 4 | 31.5   21 | 6,900   3,200 | 41   48 | 950   900 |
| | 6 | 31.5   19.5 | 5,000   3,500 | 40   30 | 800   800 |
| | 8 | 24   19.5 | 3,500   3,000 | 40   37 | 950   900 |
| | 10 | 28.5 | 4,800 | | |
| | 12 | 25.5 | 3,400 | | |
| | 14 | 26 | 4,000 | | |
| 26% Acetone | 4 | | | 34   31 | 610   500 |
| | 6 | | | 30.5   28 | 550   500 |
| | 8 | | | 27   28 | 480   500 |
| 27% Acetone | 4 | | | 24   17 | 445   380 |
| | 6 | | | 20.5   15 | 410   400 |
| | 8 | | | 22.5   17 | 390   410 |
| 30% Dioxane | 4 | 18.4 | 3,200 | 24 | 610 |
| | 6 | 18.4 | 2,700 | 21.5 | 530 |
| | 8 | 16.4 | 2,700 | 25 | 610 |
| | 10 | 17.6 | 2,700 | 31.5 | 690 |
| | 12 | 17.0 | 2,700 | 23.5 | 580 |
| | 14 | 14.2 | 1,950 | 28 | 660 |
| 15% Tetrahydrofuran | 2 | 41 | 10,500 | | |
| | 4 | 38 | 7,400 | | |
| | 6 | 36 | 8,400 | | |
| | 8 | 35 | 7,400 | | |
| | 10 | 33 | 7,400 | | |
| | 12 | 35 | 6,900 | | |
| 70% Diethylene-glycol ethyl ether (methyl Cellosolve). | 4 | 80 | 30,000 | | |
| | 6 | 66 | 22,000 | | |
| | 8 | 58 | 25,500 | | |
| 100% Methanol | 8 | 8.4 | 740 | 28   39   26   24.5   31   28 | 530   540   580   610   690   640 |

As shown in the above table, all of the membranes prepared by our novel process were capable of removing salt from water. The membranes had, in general, a high flux and a correspondingly high salt permeation. Potable water is defined as having a salt content which is not in excess of 500 parts per million. Although, most of the films were not capable of producing potable water in one pass through the test cell from a feed stream containing 35,000 parts per million of sodium chloride, certain of the films did produce potable water in the one pass from a feed stream containing 5,000 parts per million of sodium chloride.

It should be understood that a desalination apparatus can employ several cells in series where, for example, the product stream from the first cell becomes the feed stream to the second cell and so on. Thus, the membranes which were not found capable of producing potable water in one pass from a feed stream containing 35,000 parts per million of sodium chloride (approximating the salinity of sea water) would be quite capable of producing potable water from sea water in several passes. Because of the economics involved, it is more suitable in certain cases to desalinate sea water in several passes using membranes which have high fluxes and high salt permeation rather than to desalinate in one pass with a membrane having a low flux and low salt permeation. The important criterion is the total number of cells required to produce a given quantity of potable water. A low salt permeation per cell can be a meaningless figure if a very large number of low-flux cells are nonetheless required.

The solvent treatment process is illustrated in the present patent application in conjunction with a batch process for forming membranes. However, it should be understood that the process is not limited to a batch operation and could be performed readily on a continuous basis.

The length of immersion, the solvent employed and degree of water dilution of solvent, all have an effect on the amount of water extracted during annealing. The foregoing variables may be chosen along with variations in the casting solution, to give the desired water content in the membrane product. By way of illustration, the membrane could be cast onto a continuous belt which would first pass into a water bath and from thence into one or more solvent baths where the film would be treated in accord with the present invention.

Having fully defined our invention we desire to be limited only by the lawful scope of the appended claims.

We claim:

1. In a process for the manufacture of a cellulose ester reverse osmosis membrane including the steps of casting of a swollen membrane from a cellulose ester solution and the separation in a syneresis step of excess water from the gel structure of the swollen membrane, the improvement in the syneresis step comprising:

immersing the swollen gel structure membrane in a water-miscible, organic-compound-containing polar extraction liquid capable of extracting water from said membrane and substantially reducing the water content of the membrane, said water-miscible liquid having substantially no solubility for the cellulose ester for the period of immersion.

2. A process in accordance with claim 1 wherein the extraction liquid comprises a substantially pure polar water-miscible organic material, said organic material being a substantial nonsolvent for the cellulose ester.

3. A process in accordance with claim 1 wherein the extraction liquid comprises a solution of water and a polar, water-miscible organic compound normally having a significant solubility for the cellulose ester with the water being present in the extraction liquid in an amount adequate to protect the cellulose ester from dissolution by the polar organic component.

4. A process in accordance with claim 3 wherein the extraction liquid comprises an aqueous solution of acetone.

5. A process in accordance with claim 4 wherein the acetone is present in the water solution in an amount within the range of about 20 to 30% by weight.

6. A process in accordance with claim 3 wherein the extraction liquid is an aqueous solution of dioxane.

7. A process in accordance with claim 3 wherein the extraction liquid is an aqueous solution of tetrahydrofuran.

8. A process in accordance with claim 3 wherein the extraction liquid is an aqueous solution of diethyleneglycol ethyl ether.

References Cited

UNITED STATES PATENTS

| 3,310,488 | 3/1967 | Loeb et al. | 264—49 XR |
| 3,332,894 | 7/1967 | Cantor et al. | 264—41 XR |

OTHER REFERENCES

U.S. Office of Saline Water, "The Mechanism of Desalination by Reverse Osmosis and Its Relation to Membrane Structure," Research and Development Progress Report No. 143, June 1965, pp. 21–25.

PHILIP E. ANDERSON, *Primary Examiner.*

U.S. Cl. X.R.

264—41, 212, 216